US012031055B2

(12) United States Patent
Habibpour et al.

(10) Patent No.: US 12,031,055 B2
(45) Date of Patent: Jul. 9, 2024

(54) FILLED COMPOSITION WITH RAPID UV CURE TO FORM THICK COATING

(71) Applicant: Illinois Tool Works Inc., Glenview, IL (US)

(72) Inventors: Mehdi Habibpour, Glenview, IL (US); Matthew J. Lertola, Glenview, IL (US); Grant Shouldice, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 296 days.

(21) Appl. No.: 17/091,098

(22) Filed: Nov. 6, 2020

(65) Prior Publication Data

US 2021/0179887 A1    Jun. 17, 2021

Related U.S. Application Data

(60) Provisional application No. 62/948,476, filed on Dec. 16, 2019.

(51) Int. Cl.
| | |
|---|---|
| C09D 175/14 | (2006.01) |
| B05D 3/06 | (2006.01) |
| B60S 5/00 | (2006.01) |
| C08G 18/04 | (2006.01) |

(Continued)

(52) U.S. Cl.
CPC ........... *C09D 175/14* (2013.01); *B05D 3/065* (2013.01); *B60S 5/00* (2013.01); *C08G 18/04* (2013.01); *C08K 3/26* (2013.01); *C09D 7/61* (2018.01); *C08K 2003/265* (2013.01)

(58) Field of Classification Search
CPC . C09D 175/14; C08G 18/792; C08G 18/6755
See application file for complete search history.

(56) References Cited

U.S. PATENT DOCUMENTS

| 8,292,625 B2 | 10/2012 | Skaria |
| 10,252,290 B2 | 4/2019 | Zhao et al. |

(Continued)

FOREIGN PATENT DOCUMENTS

| KR | 20060020098 A | 3/2006 |
| WO | 1995019379 A1 | 7/1995 |

OTHER PUBLICATIONS

Int'l Search Report for PCT/US2020/064222, dated Apr. 8, 2021.

*Primary Examiner* — Robert S Walters, Jr.
*Assistant Examiner* — Andrew J Bowman
(74) *Attorney, Agent, or Firm* — MaxGoLaw PLLC

(57) ABSTRACT

A composition is provided that includes aliphatic urethane acrylate; a multifunctional crosslinking agent; photoinitiator; a chemical initiator system of a peroxide or azo group containing catalyst, and a cure promoter; and a particulate filler. The composition is amenable to rapid cure to a sandable condition as compared to conventional products. By adjusting the amount of particulate filler present, a product is provided that operates as a primer, a putty, or a filler. A method of vehicle body repair includes the application of an uncured layer of the composition to the vehicle body. The uncured layer is exposed to UV radiation to induce cure of the uncured layer to form a coating in a time of between 2 and 20 minutes even with an ultraviolet wavelength emitting light emitting diode (UV LED).

6 Claims, 1 Drawing Sheet

(51) Int. Cl.
  *C08K 3/26* (2006.01)
  *C09D 7/61* (2018.01)

(56) References Cited

U.S. PATENT DOCUMENTS

| | | | |
|---|---|---|---|
| 2006/0084713 A1* | 4/2006 | Bach | C08G 18/6755 522/168 |
| 2007/0043142 A1 | 2/2007 | Dodiuk-Kenig et al. | |
| 2008/0160320 A1* | 7/2008 | Beck | C08G 18/792 428/423.4 |
| 2011/0206858 A1 | 8/2011 | Loeffler et al. | |
| 2011/0287190 A1 | 11/2011 | Bulluck | |

* cited by examiner

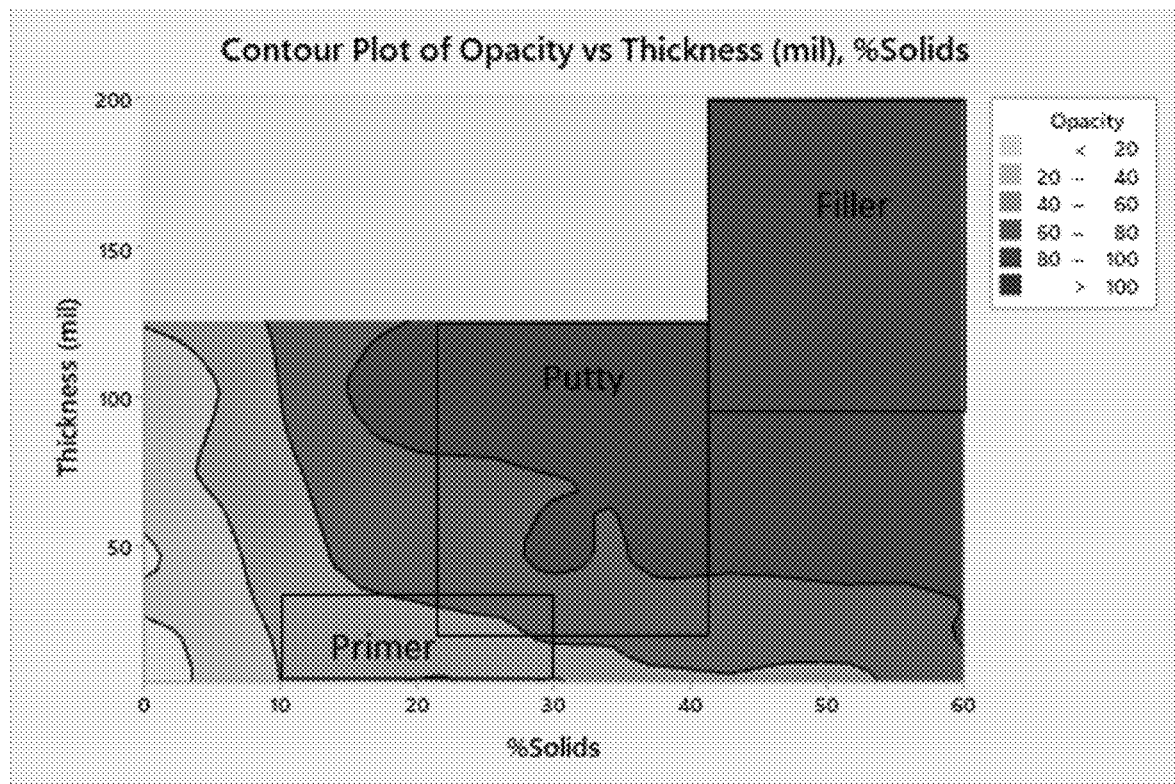

FILLED COMPOSITION WITH RAPID UV CURE TO FORM THICK COATING

CROSS REFERENCE TO RELATED APPLICATIONS

This application claims priority benefit of U.S. Provisional Application Ser. No. 62/948,476 filed 16 Dec. 2019, the contents of which are hereby incorporated by reference.

FIELD OF THE INVENTION

The present invention in general relates to an unsaturated acrylate composition for vehicle body repair that cures rapidly compared to existing products, and in particular to rapid buildup of thick coating and cure of same to strongly adhere to metal substrates found on vehicle body panels and bumpers.

BACKGROUND OF THE INVENTION

Body filler compositions are used in the vehicle repair aftermarket industry to repair of deformities such as holes and dents in vehicle bodies. The filler composition cures following application to the deformity and upon reaching a level of hardness, the resulting coating overlying the defect is sanded and finished with suitable painting steps to affect the repair of the vehicle body.

Conventional body filler compositions represent a balance of properties to allow sufficient working time to shape the composition into a desired surface contour to generally match the contours of the undamaged vehicle body. Curing quickly is desired to allow for sanding and further repair steps.

It is conventional to utilize two-part curable resin systems in this context in which a mixture of a base and a curing agent initiates cure and the onset of working time. The curing time is controlled to a certain extent by the ratio of curing agent to reactive moieties, but this is not a simple proportionality that is further influenced by conditions such as temperature, applied composition thickness, and humidity. The result of this uncertainty is a variety of defects that illustratively include tacky surface, poor featheredging, poor adhesion, blistering, lifting, or pin-holing of the cured coating. Generally, working time to apply a composition controls and too rapid a viscosity increase in a material being applied requires the repair to be repeated, and as a result cure times to a sandable hardness are too long for the preference of most users. As a result, a coating on a vehicle body that is in the process of cure idles a working bay and a worker while the cure to a sandable coating occurs. Attempting to sand a partially cured coating leads to smear of the coating and the requirement that the repair to be retouched or replaced.

UV cured compositions have been contemplated, such as those detailed in CN 102827505B; EP 247563B1; U.S. Pat. No. 3,359,129; EP 07747B1; EP 774492B1; U.S. Pat. Nos. 4,415,604; 4,675,234; 6,228,433; 7,335,402; 8,833,989; 9,975,314; 10,336,038; US2011/0206858A; and WO09/145781A1. However, these have met with limited success in vehicle body repairs owing to a variety of factors including the nature of volatiles emitted therefrom, the need for a UV curing lamp, and the degree of cure. UV curing lamps routinely contain mercury and are hazardous to operate owing to emitted UV spectra and lamp heating.

Thus, there exists a need for improved compositions that provide and address the limitations of the prior art. There further exists a need for a composition that is UV curable with an inexpensive and comparatively safe LED actinic cure source. As a result, once a coating has been shaped during the working time, it is quickly cured by exposure to a UV light source, compared to conventional two-part resin systems. The cure being less influenced by environmental factors than conventional two-part resin systems.

SUMMARY OF THE INVENTION

A composition is provided that includes aliphatic urethane acrylate; a multifunctional crosslinking agent; photoinitiator; a chemical initiator system comprising a peroxide or azo group containing catalyst and a cure promoter; and a particulate filler. The composition is amenable to rapid cure to a sandable condition as compared to conventional products. By adjusting the amount of particulate filler present, a product is provided that operates as a primer, a putty, or a filler.

A method of vehicle body repair includes the application of an uncured layer of the composition to the vehicle body. The uncured layer is exposed to UV radiation to induce cure of the uncured layer to form a coating in a time of between 2 and 20 minutes even with an ultraviolet wavelength emitting light emitting diode (UV LED).

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein like reference numerals refer to like parts throughout the several views, and in which:

FIG. 1 is a plot of opacity as plotted as a function of percent filler solids and thickness of a cured composition.

DETAILED DESCRIPTION OF THE PREFERRED EMBODIMENTS

Compositions are provided for vehicle body repair. Based on the filler content and coating thickness, these inventive compositions function as primers, putties, and fillers. Embodiments of the inventive compositions provide fast curing coating compositions that utilize photo polymerization reactions using a variety of light sources such as low energy consuming and environmentally-friendly ultraviolet light emitting diode (UV-LED) and sunlight. Absent UV exposure, an inventive composition has a working time that is longer than conventional two-part repair systems, yet cures more rapidly upon UV exposure thereby offering a user a controlled working time and a rapid cure thereafter. As a result, the applied material can be corrected or reworked without worrying about the viscosity build of the material that is common to conventional two-part repair systems.

The fast curing of embodiments of the inventive coating make it possible to achieve ready to sand in from 1 to 5 minutes for a coating thicknesses of 5 millimeters (mm).

As used herein, "sandable" with reference of a cured inventive composition is defined as having limited clogging of sandpaper and able to form a featheredge.

Numerical ranges cited herein are intended to recite not only the end values of such ranges but the individual values encompassed within the range and varying in single units of the last significant FIGURE. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

Table 1 lists the major components of an embodiment of the inventive curable composition.

TABLE 1

Formulation of a UV curable vehicle body repair composition

| Ingredient | Typical Total Weight Percent | Preferred Total Weight Percent |
|---|---|---|
| Aliphatic urethane acrylate resin | 10-55 | 15-35 |
| Multifunctional crosslinking agent | 10-55 | 15-35 |
| Photoinitiator(s) | 0.5-5 | 1-3 |
| Cure promoter | 0.05-5 | 0.1-0.9 |
| Catalyst | 0.05-5 | 1-3 |
| Additives | Each: 0.5-5 | Each: 1-3 |
| Filler | Remainder | Remainder |

The extent that the amount of filler is modified to yield different vehicle body repair products is detailed in FIG. 1. FIG. 1 is a plot of opacity as a function of percent filler solids and thickness of a cured composition.

An actinic radiation curable resin is present in an inventive composition in the form of an aliphatic urethane acrylate oligomer or polymeric resin. Such resins are readily formed from polyether polyol, a diisocyanate and hydroxyethyl acrylate. The resin typically has a number average molecular weight of 1,000 to 20,000 Daltons. Diisocyanates operative herein illustratively include dicyclohexyl methane diisocyanate, isophorone diisocyanate. It is appreciated that aliphatic urethane acrylate resins are typically sold commercially as a 60 to 85% by weight in a diluent such as trimethylolpropane triethoxy triacrylate, pentaerythritol tri/tetracrylate, or the like. Still other actinic radiation curable resins operative herein are detailed in U.S. Pat. No. 5,908,873.

A crosslinking agent that is multifunctional is also present in an inventive composition. As used herein, multifunctional is defined as a compound that has a polymerizable functionality of at least 2. Difunctional crosslinking agents are particularly well suited for use in the present invention. Crosslinking agents operative in the present invention illustratively include diallyl fumarate, diallyl diglycol carbonate, allyl methacrylate, isobornyl acrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol dimethacrylate, N,N'-methylenebismethacrylamide, 1,9-nonanediol dimethacrylate, pentaerythritol tetraacylate, pentaeythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, dipropylene glycol diacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl) phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl]glutarate, bis[-(vinyloxy)butyl]succinate, bis((4-((-vinyloxy)methyl)cyclohexyl)methyl)isophthalate, bis(4-(vinyloxy)butyl)terephthalate, bis[[(4-[vinyloxy)methyl)cyclohexyl]methyl]terephthalate, bis[4-vinyloxy)butyl]adipate, bis[4-(vinyloxy)butyl](methylenedi-1,4-phenylene)biscarbamate, bis-[4-(vinyloxy) butyl](4-methyl-1,3-phenylene)biscarbamate, bis[4-(vinyloxy)butyl]1,6-hexanediylbiscarbamate, tris[4-(vinyloxy) butyl]trimellitate or combinations thereof. It is appreciated that a minority amount of trifunctional or higher functional crosslinking agent present modifies the cured coating properties.

In order to achieve enhanced rates of actinic cure, a photoinitiator is present from 0.5 to 5 total weight percent. Bisacylphosphine oxides (BAPO) are exemplary of a photoinitiator operative in the present invention. Specific bisacylphosphine oxides operative herein illustratively in phenyl bis(2, 4, 6-trimethylbenzoyl)-phosphine oxide, diphenyl(2, 4,6-trimethylbenzoyl)phosphine oxide, bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-ethoxyphenylphosphineoxide,bis-(2,6-dichlorobenzoyl)-4-biphenylylphosphineoxide,bis-(2,6-dichlorobenzoyl)-4-propylphenylphosphine oxide, bis-(2,6-dichlorobenzoyl)-2-naphthylphosphine oxide, bis-(2,6-dichlorobenzoyl)-1-napthylphosphine oxide, bis-(2,6-dichlorobenzoyl)-4-chlorophenylphosphine oxide, bis-(2,6-dichlorobenzoyl)-2,4-dimethoxyphenylphosphine oxide, bis-(2,6-dichlorobenzoyl)decylphosphine oxide, bis-(2,6-dichlorobenzoyl)-4-octylphenylphosphine oxide, bis-(2,6-dimethoxybenzoyl)-2,5-dimethylphenylphosphineoxide bis-(2,6-dimethoxybenzoyl)phenylphosphine oxide, bis-(2,4,6-trimethylbenzoyl)-2,5-dimethylphenylphosphine oxide, bis-(2,6-dichloro-3,4,5-trimethoxybenzoyl)-2,5-dimethylphenylphosphine oxide, bis-(2,6-dichloro-3,4,5-trimethoxybenzoyl)-4-ethoxyphenylphosphine oxide, bis-(2-methyl-1-naphthoyl)-2,5-dimethylphenylphosphine oxide, bis-(2-methyl-1-naphthoyl)phenylphosphine oxide, bis-(2-methyl-1-naphthoyl)-4-biphenylphosphine oxide, bis-(2-methyl-1-naphthoyl)-4-ethoxyphenylphosphine oxide, bis-(2-methyl-1-naphthoyl)-2-naphthylphosphine oxide, bis-(2-methyl-1-naphthoyl)-4-propylphenylphosphine oxide, bis-(2-methyl-1-naphthoyl)-2,5-dimethylphosphine oxide, bis-(2-methoxy-1-naphthoyl)-4-ethoxyphenylphosphine oxide, bis-(2-methoxy-1-naphthoyl)-4-biphenylylphosphine oxide, bis-(2-methoxy-1-naphthoyl)-2-naphthylphosphine oxide, bis-(2-chloro-1-naphthoyl)-2,5-dimethylphenylphosphine oxide, and combinations thereof. In some inventive embodiments, liquid blends of photoinitiators are provided by dissolving solid bisacylphosphine oxide photoinitiator in another liquid photoinitiator or a photoinitiator blend which is of liquid form.

It is appreciated that BAPO photoinitiators have strong light absorption in the wavelength range of 380 nm to 420 nm and this is a reason that conventional mercury vapor arc lamps and fluorescent light sources are used to activate this class of photoinitiators. However, the chromophoric phosphinyl group of BAPO confers a coloration to the photoinitiator thereby changing the optical density in the UV-A spectral region of the layer during irradiation to complicate and reduce the efficiency during the cure process. As a result, surface cure rates are different than those in the interior of the layer being cured.

In some inventive embodiments, a catalyst is also present in combination with the aforementioned BAPO photoinitiators. The catalyst if used, are also present from 0.5 to 5 total weight percent, and with BAPO photoinitiator in weight ratios of 0.1-1:1. Exemplary catalysts operative herein illustratively include diacylperoxides, hydroperoxides, ketone peroxides, peroxyesters, peroxyketals, dialkyl peroxides, alkyl peresters and percarbonates. Azo-type catalsysts operative herein illustratively include azobisisobutyronitrile (AIBN). Benzoyl peroxide (BPO) is a prototypical free-radical cure catalyst.

Without intending to be bound to a particular theory, peroxides after UV light absorption undergo a bimolecular reaction followed by proton abstraction from the hydrogen donating chemical initiator. While the thickness of UV cure possible with compositions containing particulate filler are considered to be limited to little more than 1 mm, it has been surprising found that an inventive composition achieves a rapid and efficient through-cure. Without intended to be bound to a particular theory of operation, inclusion of a chemical initiator in the composition appears to initiate curing in the volume of the layer to be cured that is not exposed to UV photons impinging on the layer surface.

A cure promoter is present from 0.05 to 5 total weight percent. In the reaction, the cure promoter, donates free hydrogen and can also consume a certain amount of oxygen to prevent an oxygen quenching effect on the photoinitiator under cure conditions. Cure promoters operative herein include tertiary amines, beta-ketoamines, methylene groups adjacent to oxygen of an epoxide group, and polyethers, the aforementioned miscible and compatible with the crosslinking agent. Specific chemical initiators operative herein include N,N-Bis(2-hydroxyethyl)-p-toluidine, 2-ethylhexyl-4-dimethylaminobenzoate, ethyl-4-dimethylaminobenzoate, 3,3'-dimethyl-methylene-di(cyclohexylanine), Lasalocid A; and combinations thereof.

It is appreciated that the cure promoter in combination with the catalyst function as a chemical initiation system. The chemical initiation system is believed to be especially important in cure activation within the bulk of a particulate filled layer that otherwise would cure effectively through actinic radiation impinging on the layer surface.

Several additives are readily included in an inventive formulation that illustratively include light and heat stabilizers to maintain clarity of the cured adhesives, adhesion promoters, flow control additives, pigments and dyes and combinations thereof. Generally, each of the aforementioned additives is independently present from 0.5 to 5 total weight percent.

Filler particulates or fibers operative in the present invention illustratively include talc, alumina trihydrate, calcium sulfate, calcium carbonate, magnesium sulfate, magnesium carbonate, barium sulfate, microspheroids and the like. A filler is present from 0 to remainder total weight percent of a complete formulation for application to a substrate, with a typical upper limit being 60 total weight percent. It is appreciated that a pigment and filler can have the same function and in those instances where both are present in a formulation, the amounts of both are cumulative.

As used herein a microspheroid is defined to include a hollow microsphere or a solid bead having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microspheroid typically has a longest linear dimension of between 20 and 100 microns to improve sandability and reduce density.

It is appreciated that the composition can readily be reapplied as many times as necessary, either before or after initiation of cure.

The UV radiation necessary for curing can be provided from several sources, including mercury arc lamps and UV-light emitting diodes (UV-LED). Because of the lower consumption of energy, and reduced heating of the substrate, UV-LED curing is often a preferred actinic radiation source for curing relative to a mercury arc lamp. The UV-LED bulbs do not generate ozone, in contrast to the typical UV-bulbs, require less energy, and exhibit a longer lifetime. The absence of mercury also promotes ease of disposal. UV LEDs emissions a nm, 385 nm, 395 nm, and 405 nm are each alone or in combination suitable for inducing cure of an inventive formulation. Typical rates of cure for an inventive composition is 3 to 5 minutes for 5 mm thick composition.

The present invention is further detailed with respect to the following non limiting examples. These examples are not intended to limit the scope of the invention but rather highlight properties of specific inventive embodiments and the superior performance thereof relative to comparative examples.

EXAMPLES

Example 1

An inventive composition is provided based on aliphatic urethane acrylate resin (26 total weight percent), crosslinking agents of hexanediol diacrylate, dipropylene glycol diacrylate, and trimethylolpropane triacrylate (each present at 9 total weight percent), a BAPO photoinitiator (1 total weight percent), a catalyst of BPO (0.2 total weight percent), a cure promoter of N,N-Bis(2-hydroxyethyl)-p-toluidine (0.2 total weight percent), and the remainder being equal amounts of 5 micron calcium carbonate and 24 micron solid ethylvinyl acetate polymer microspheroids. The inventive composition is layered onto a substrate to a thickness of 5 mm and after exposure to actinic radiation from a UV-LED at 395 nm for 3 minutes, the applied layer cures to a sandable condition in 5 minutes.

Example 2

The process of Example 1 is repeated with the aliphatic urethane acrylate resin present at 36 total weight percent instead of 26 total weight percent. A similar cure profile results.

Example 3

The process of Example 1 is repeated with 0.8 total weight percent BPO and a corresponding reduction in the calcium carbonate. A similar cure profile results.

Comparative Example A

The process of Example 1 is repeated with a like amount of BPO in place of the BAPO photoinitiator. The applied layer cures to a sandable condition in 20 minutes.

Comparative Example B

The process of Example 1 is repeated without the N,N-Bis(2-hydroxyethyl)-p-toluidine and the layer having a thickness of 5 mm. The applied layer cured unevenly with only surface cure occurred even after 20 minutes.

Comparative Example C

The process of Example 1 is repeated with a like amount of dimethyl-p-toluidine (DMPT) instead of N,N-Bis(2-hydroxyethyl)-p-toluidine. The resulting 5 mm layer does not cure completely if exposed to UV LED emission yet cures in 20-30 minutes if only mixed with BPO and not exposed to UV LED emission.

Comparative Example D

The process of Example 1 is repeated with a like amount of dimethylaniline (DMA) instead of N,N-Bis(2-hydroxyethyl)-p-toluidine The resulting 5 mm layer does not cure completely if exposed to UV LED emission yet cures in 20-30 minutes if only mixed with BPO and not exposed to UV LED emission.

Comparative Example E

The process of Example 1 is repeated absent BPO. A 1 mm layer cures if exposed to UV LED emission in 5 minutes, but thicker layers do not properly cure.

Comparative Example F

The process of Example 1 is repeated absent N,N-Bis(2-hydroxyethyl)-p-toluidine. A 1 mm layer cures if exposed to UV LED emission in 5 minutes, but thicker layers do not properly cure.

Comparative Example G, H, and I

The process of Example 1 is repeated with: (2-hydroxy-2-methyl-1-phenylpropanone) (Comparative Example G), 1-hydroxycyclohexyl phenyl ketone (Comparative Example H), or 4-methylbenzophenone (Comparative Example I) in like amount and in place of N,N-Bis(2-hydroxyethyl)-p-toluidine. The applied layers cure to a sandable condition in 20 minutes. These examples demonstrate the processes to be claimed in this patent filing. It should be remarked that other additions and modifications as known in the art are also expected to be covered.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A method of repairing a vehicle body comprising:
applying an uncured layer of a composition comprising:
an aliphatic urethane acrylate resin; a multifunctional crosslinking agent together with the aliphatic urethane acrylate resin being present up to 70 total weight precent; a photoinitiator; a chemical initiator system, and a cure promoter together with the photoinitiator and the chemical initiator system being present up to 6.9 total weight precent; and a particulate filler in an amount to yield an opacity of greater than 20% to the vehicle body and being present in an amount of at least 20 total weight percent; and
exposing the uncured layer to actinic radiation to induce cure of the uncured layer to sandable coating in a time of between 1 and 5 minutes for a thickness of 5 millimeters.

2. The method of claim 1 wherein the actinic radiation is an emission from an ultraviolet light emitting diode.

3. The method of claim 2 wherein the actinic radiation has a wavelength of 385 nm or longer wavelength.

4. The method of claim 1 wherein the time is from 3 to 5 minutes for a thickness of said uncured layer of 5 mm.

5. The method of claim 1 wherein the particulate filler of the applied composition comprises at least 5 total weight percent of microspheroids.

6. The method of claim 1 wherein the cure promoter of the applied composition is one of 2-ethylhexyl-4-dimethylaminobenzoate, ethyl-4-dimethylaminobenzoate, 3,3'-dimethylmethylene-di(cyclohexylamine), Lasalocid A; or a combination thereof.

* * * * *